(12) United States Patent
Choe et al.

(10) Patent No.: US 9,872,041 B2
(45) Date of Patent: Jan. 16, 2018

(54) METHOD AND APPARATUS FOR TRANSCEIVING IMAGE COMPONENT FOR 3D IMAGE

(71) Applicant: LG ELECTRONICS INC., Seoul (KR)

(72) Inventors: Jeehyun Choe, Seoul (KR); Jongyeul Suh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 386 days.

(21) Appl. No.: 14/419,883

(22) PCT Filed: Aug. 12, 2013

(86) PCT No.: PCT/KR2013/007226
§ 371 (c)(1),
(2) Date: Feb. 5, 2015

(87) PCT Pub. No.: WO2014/025239
PCT Pub. Date: Feb. 13, 2014

(65) Prior Publication Data
US 2015/0229966 A1    Aug. 13, 2015

Related U.S. Application Data

(60) Provisional application No. 61/681,633, filed on Aug. 10, 2012.

(51) Int. Cl.
*H04N 19/597* (2014.01)
*H04N 13/00* (2006.01)
(Continued)

(52) U.S. Cl.
CPC ....... *H04N 19/597* (2014.11); *H04N 13/0048* (2013.01); *H04N 19/44* (2014.11);
(Continued)

(58) Field of Classification Search
None
See application file for complete search history.

(56) References Cited

U.S. PATENT DOCUMENTS

| 2011/0064146 A1 | 3/2011 | Chen et al. |
| 2011/0216833 A1* | 9/2011 | Chen .................. H04N 13/0022 375/240.16 |

(Continued)

FOREIGN PATENT DOCUMENTS

| CN | 102055982 A | 5/2011 |
| KR | 10-2011-0049137 A | 5/2011 |

(Continued)

OTHER PUBLICATIONS

Chen et al, "High Level Syntax for 3DV-HEVC", International Organisation for Standardisation Organisation Internationale de Normalisation Coding of Moving Pictures and Audio, ISO/IEC JTC1/SC29/WG11, MPEG2012/m23806, Feb. 2012, pp. 1-7.

(Continued)

*Primary Examiner* — Kate Luo
(74) *Attorney, Agent, or Firm* — Birch, Stewart, Kolasch & Birch, LLP

(57) ABSTRACT

The method for transmitting an image component for a 3D image according to one embodiment of the present invention comprises: a step of generating one or more texture image components and one or more depth map image components; a step of generating an SEI (supplemental enhancement information) message including a 3D layer information element for signaling layer information relating to coding between said one or more texture image components and one or more depth map image components; a step of generating an NAL unit including the SEI message including said 3D layer information element; and a step of generating a broadcast signal including said one or more texture image (Continued)

components, said one or more depth map image components and the NAL unit.

17 Claims, 15 Drawing Sheets

(51) Int. Cl.
    *H04N 19/44*     (2014.01)
    *H04N 19/70*     (2014.01)
    *H04N 19/46*     (2014.01)

(52) U.S. Cl.
    CPC ............. *H04N 19/46* (2014.11); *H04N 19/70* (2014.11); *H04N 2213/005* (2013.01)

(56) References Cited

U.S. PATENT DOCUMENTS

2011/0298895 A1    12/2011    Tian et al.
2012/0044322 A1    2/2012    Tian et al.
2013/0250052 A1    9/2013    Suh et al.

FOREIGN PATENT DOCUMENTS

| | | |
|---|---|---|
| KR | 10-2011-0111389 A | 10/2011 |
| KR | 10-2011-0116239 A | 10/2011 |
| KR | 10-2012-0081022 A | 7/2012 |
| WO | WO 2010/043773 A1 | 4/2010 |
| WO | WO 2010/079893 A2 | 7/2010 |
| WO | WO 2010/096189 A1 | 8/2010 |
| WO | WO 2012/074328 A2 | 6/2012 |

OTHER PUBLICATIONS

Hannuksela, Editor, "Test Model for AVC-based 3D video coding v2.0," International Organisation for Standardisation, ISO/IEC JTC1/SC29/WG11, Coding of Moving Pictures and Audio, ISO/IEC JTC1/SC29/WG11 MPEG2012/N12743, Jul. 2012, 22 pages, XP030019216.

* cited by examiner

FIG. 3

|  | 3D High | 3D Extended High |
|---|---|---|
| Codec Compatibility of Texture view | Compatible with H.264/MVC codec | Compatible with H.264/AVC codec |
| Texture-depth dependency | Dependency does not exist between texture and depth T and D is coded independently into a single coded bitstream. | Dependency exists between texture and depth Joint coding of T and D into a single bitstream. |

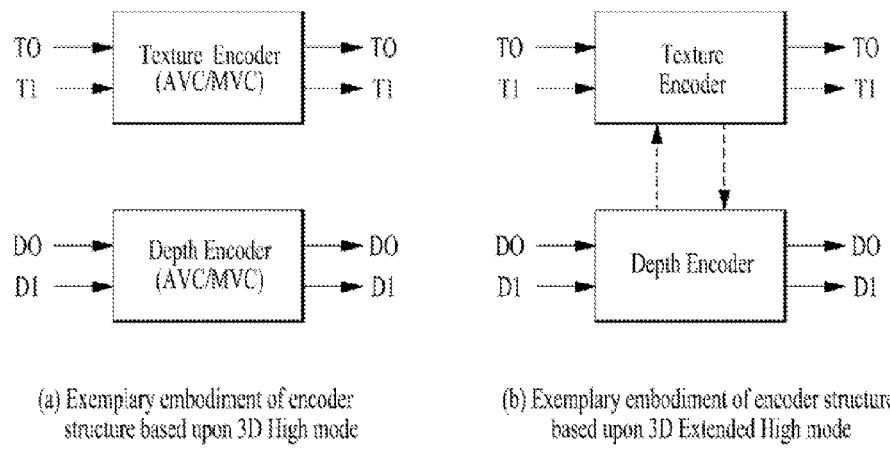

(a) Exemplary embodiment of encoder structure based upon 3D High mode (b) Exemplary embodiment of encoder structure based upon 3D Extended High mode

FIG. 6
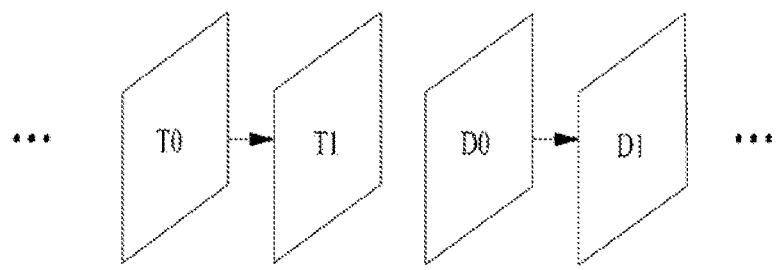
(a)
T0, T1, D0, D1, ... (two AVC/MVC compatible texture views)
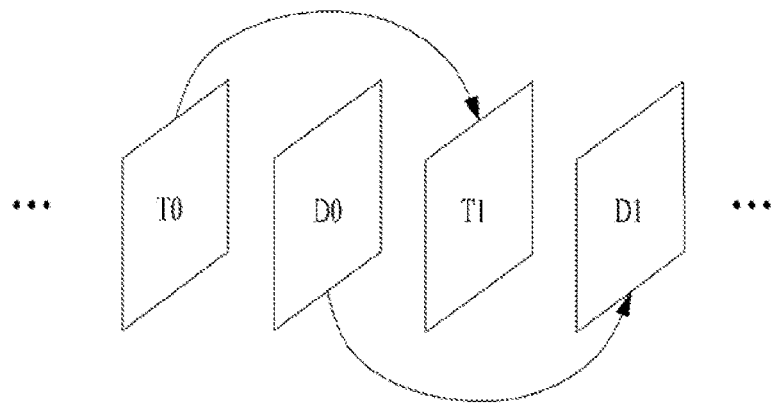
(b)
T0, D0, T1, D1, ... (two AVC/MVC compatible texture views)
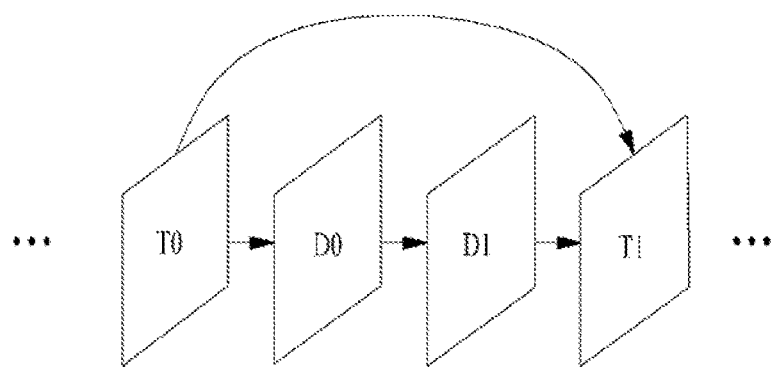
(c)
T0, D0, D1, T1, ... (one AVC compatible texture view, one enhanced texture view)

FIG. 7
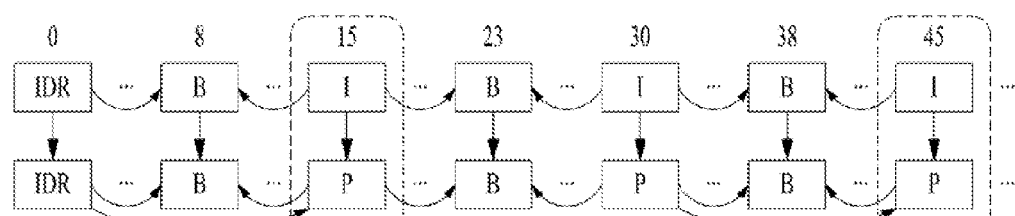
(a)
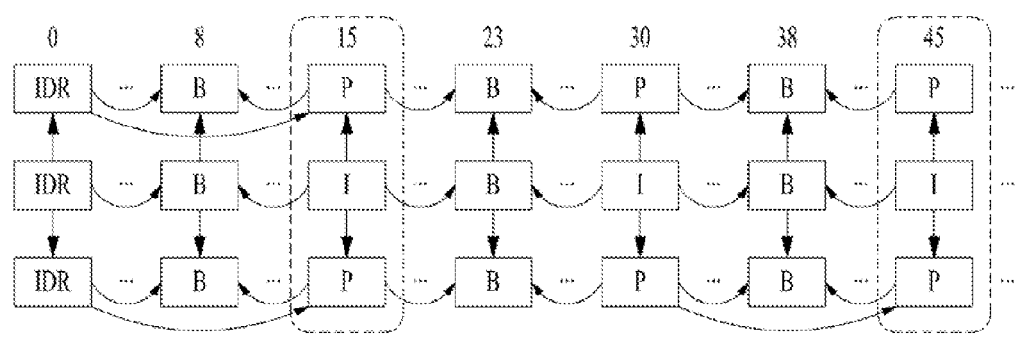
(b)
FIG. 8
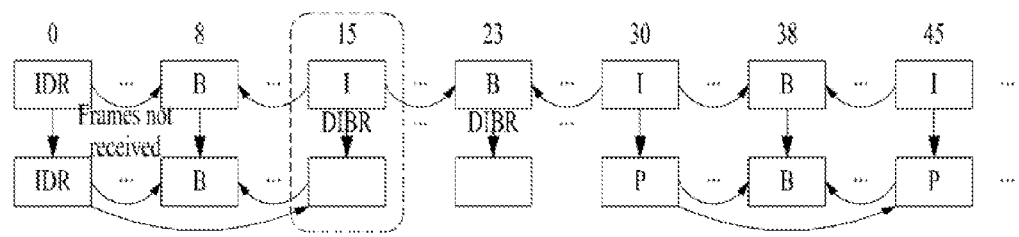

FIG. 9

| Syntax | No. of bits | Format |
|---|---|---|
| 3D_view_dependency_descriptor ( ) { | | |
|   descriptor_tag | 8 | 0xTBD |
|   descriptor_length | 8 | uimsbf |
|   3D_mode | 1 | uimsbf |
|   reserved | 7 | '1111111' |
|   for (i=0; i<N; i++) { | | |
|     view_ID | 8 | uimsbf |
|     view_PID | 13 | uimsbf |
|     independent_texture_coding_flag | 1 | uimsbf |
|     existence_of_corresponding_depth | 1 | uimsbf |
|     reserved | 1 | '1' |
|     If(existence_of_corresponding_depth == 1) { | | |
|       depth_PID | 13 | uimsbf |
|       depth_hor_upsampling_factor | 4 | bslbf |
|       depth_ver_upsampling_factor | 4 | bslbf |
|       reserved | 3 | '111' |
|     } | | |
|   } | | |
|   GVR_included | 1 | uimsbf |
|   cam_param_included | 1 | uimsbf |
|   reserved | 6 | '111111' |
| } | | |

FIG. 10

| Value | Description |
|---|---|
| 0000 | Forbidden |
| 0001 | Unspecified. |
| 0010 | Coded resolution is same as coded resolution of texture view component. |
| 0011 | Coded resolution is ¾ coded resolution of texture view component. |
| 0100 | Coded resolution is 2/3 coded resolution of texture view component. |
| 0101 | Coded resolution is 1/2 coded resolution of texture view component. |
| 0110-1000 | reserved |
| 1001-1111 | user_private |

FIG. 11

| Syntax | No. of bits | Mnemonic |
|---|---|---|
| TS_program_map_section ( ) { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0; i< N; i++) { | | |
|         descriptor( ) | | |
|     } | | |
|     for (i=0; i< N1; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i< N2; i++) { | | |
|             descriptor( ) | | |
|         } | | |
|     } | | |
|     CRC_32 | 32 | rpchof |
| } | | | descriptor( ) → 3D view dependency descriptor

FIG. 12

| Syntax | No. of bits | Format |
|---|---|---|
| 3D_hierarchy_descriptor ( ) { | | |
|    descriptor_tag | 8 | 0xTBD |
|    descriptor_length | 8 | uimsbf |
|    reserved | 7 | ?111111 |
|    hierarchy_view_type | 1 | uimsbf |
|    hierarchy_view_ID | 8 | uimsbf |
|    num_hierarchy_embeded_views | 8 | uimsbf |
|    for (i=0; i<num_hierarchy_embeded_views;i++) { | | |
|      reserved | 7 | ?111111 |
|      hierarchy_embeded_view_type | 1 | uimsbf |
|      hierarchy_embedded_view_ID | 8 | uimsbf |
|      coding_priority_index | 8 | uimsbf |
|    } | | |
|    hor_upsampling_factor | 4 | bslbf |
|    ver_upsampling_factor | 4 | bslbf |
| } | | |

FIG. 13

| Value | Description |
|---|---|
| 0000 | Forbidden |
| 0001 | Unspecified. |
| 0010 | Coded resolution is same as coded resolution of base texture view component. |
| 0011 | Coded resolution is ¾ coded resolution of base texture view component. |
| 0100 | Coded resolution is 2/3 coded resolution of base texture view component. |
| 0101 | Coded resolution is 1/2 coded resolution of base texture view component. |
| 0110 - 1000 | reserved |
| 1001 - 1111 | user_private |

FIG. 14

| Syntax | No. of bits | Mnemonic |
|---|---|---|
| TS_program_map_section ( ) { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0; i< N; i++) { | | |
|         descriptor( ) | | |
|     } | | |
|     for (i=0; i< N1; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i< N2; i++) { | | |
|             descriptor( ) | | |
|         } | | |
|     } | | |
|     CRC_32 | 32 | rpchof |
| } | | | descriptor( ) → 3D Hierarchy descriptor

FIG. 15

| Value | Description |
|---|---|
| ... | ... |
| 0x02 | Rec. ITU-T H.262 | ISO/IEC 13818-2 Video or ISO/IEC 11172-2 constrained parameter video stream (see note 2) |
| ... | ... |
| 0x1B | AVC video stream conforming to one or more profiles defined in Annex A of Rec. ITU-T H.264 | ISO/IEC 14496-10 or AVC video sub-bitstream of SVC as defined in 2.1.78 or MVC base view sub-bitstream, as defined in 2.1.85, or AVC video sub-bitstream of MVC, as defined in 2.1.88 |
| ... | ... |
| 0x1F | SVC video sub-bitstream of an AVC video stream conforming to one or more profiles defined in Annex G of Rec. ITU-T H.264 | ISO/IEC 14496-10 |
| 0x20 | MVC video sub-bitstream of an AVC video stream conforming to one or more profiles defined in Annex H of Rec. ITU-T H.264 | ISO/IEC 14496-10 |
| ... | ... |
| 0x22 | Additional view Rec. ITU-T H.262 | ISO/IEC 13818-2 video stream for service-compatible stereoscopic 3D services (see note 3 and 4) |
| 0x23 | Additional view Rec. ITU-T H.264 | ISO/IEC 14496-10 video stream conforming to one or more profiles defined in Annex A for service-compatible stereoscopic 3D services (see note 3 and 4) |
| 0x24 | AVC depth stream conforming to one or more profiles defined in Annex A of Rec. ITU-T H.264 | ISO/IEC 14496-10 or MVC base view sub-bitstream, as defined in 2.1.85, or AVC video sub-bitstream of MVC, as defined in 2.1.88 (indicates depth stream being compatible with H.264/AVC) |
| 0x25 | MVC depth sub-bitstream of an AVC depth stream conforming to one or more profiles defined in Annex H of Rec. ITU-T H.264 | ISO/IEC 14496-10 (indicates depth stream being with MVC) |
| 0x26 | 3D video sub-bitstream of an AVC texture stream (Video stream being compressed by using a new coding method that is not compatible with conventional AVC/MVC codec – inter-layer prediction using depth data, etc., included) |
| 0x27 | 3D video sub-bitstream of an AVC depth stream (Depth stream being compressed by using a new coding method that is not compatible with conventional AVC/MVC codec ? inter-layer prediction using video (texture) data, etc., included) |
| 0x28-0x7E | Rec. ITU-T H.222.0 | ISO/IEC 13818-1 Reserved |

FIG. 16

| sei_payload(payloadType,payloadSize){ | Category | Descriptor |
|---|---|---|
| if( payloadType= =48) | | |
|    3D_view_dependency_info(payloadSize) | 5 | |
| if( payloadType= =49) | | |
|    3D_hierarchy_info(payloadSize) | 5 | |
| if( payloadType= =50) | | |
|    GVR_info(payloadSize) | 5 | |

FIG. 17

| 3D_view_dependency_info (payloadSize){ | C | Descriptor |
|---|---|---|
|   3D_view_dependency_info_id | 5 | ue(v) |
|   3D_complete_views_or_not_flag | 5 | u(1) |
|   3D_mode | 5 | u(1) |
|   for (i=0; i<N; i++) { | | |
|     view_ID | 5 | u(8) |
|     independent_texture_coding_flag | 5 | u(1) |
|     existence_of_corresponding_depth | 5 | u(1) |
|   } | | |
|   GVR_included | 5 | u(1) |
|   cam_param_included | 5 | u(1) |
| } | | |

FIG. 18

| 3D_hierarchy_info (payloadSize) { | C | Descriptor |
|---|---|---|
| 3D_hierarchy_info_id | 5 | ue(v) |
| hierarchy_view_type | 5 | u(1) |
| hierarchy_view_ID | 5 | u(8) |
| num_hierarchy_embeded_views | 5 | u(8) |
| for (i=0; i<num_hierarchy_embeded_views; i++) { | | |
|    hierarchy_embeded_view_type | 5 | u(1) |
|    hierarchy_embedded_view_ID | 5 | u(8) |
|    coding_priority_index | 5 | u(8) |
| } | | |
| } | | |

FIG. 19

| 3D_hierarchy_info (payloadSize) { | C | Descriptor |
|---|---|---|
| GVR_flag | 5 | u(1) |
| num_3D_extended_views | 5 | u(8) |
| for (i=0; i<num_3D_extended_views ; i++) { | | |
|    view_ID | 5 | u(1) |
| } | | |
| } | | |

FIG. 20

| nal_unit_type | Content of NAL unit and RBSP syntax structure | C | Annex A NAL unit type class | Annex G and Annex H NAL unit type class |
|---|---|---|---|---|
| 0 | Unspecified | | non-VCL | non-VCL |
| 1 | Coded slice of a non-IDR picture slice_layer_without_partitioning_rbsp( ) | 2, 3, 4 | VCL | VCL |
| 2 | Coded slice data partition A slice_data_partition_a_layer_rbsp( ) | 2 | VCL | not applicable |
| 3 | Coded slice data partition B slice_data_partition_b_layer_rbsp( ) | 3 | VCL | not applicable |
| 4 | Coded slice data partition C slice_data_partition_c_layer_rbsp( ) | 4 | VCL | not applicable |
| 5 | Coded slice of an IDR picture slice_layer_without_partitioning_rbsp( ) | 2, 3 | VCL | VCL |
| 6 | Supplemental enhancement information (SEI) sei_rbsp( ) | 5 | non-VCL | non-VCL |
| 7 | Sequence parameter set seq_parameter_set_rbsp( ) | 0 | non-VCL | non-VCL |
| 8 | Picture parameter set pic_parameter_set_rbsp( ) | 1 | non-VCL | non-VCL |
| 9 | Access unit delimiter access_unit_delimiter_rbsp( ) | 6 | non-VCL | non-VCL |
| 10 | End of sequence end_of_seq_rbsp( ) | 7 | non-VCL | non-VCL |
| 11 | End of stream end_of_stream_rbsp( ) | 8 | non-VCL | non-VCL |
| 12 | Filler data filler_data_rbsp( ) | 9 | non-VCL | non-VCL |
| 13 | Sequence parameter set extension seq_parameter_set_extension_rbsp( ) | 10 | non-VCL | non-VCL |
| 14 | Prefix NAL unit prefix_nal_unit_rbsp( ) | 2 | non-VCL | suffix dependent |
| 15 | Subset sequence parameter set subset_seq_parameter_set_rbsp( ) | 0 | non-VCL | non-VCL |
| 16..18 | Reserved | | non-VCL | non-VCL |
| 19 | Coded slice of an auxiliary coded picture without partitioning slice_layer_without_partitioning_rbsp( ) | 2, 3, 4 | non-VCL | non-VCL |
| 20 | Coded slice extension slice_layer_extension_rbsp( ) | 2, 3, 4 | non-VCL | VCL |
| 21 | Coded slice 3D extension slice_layer_extension_rbsp( ) | | | |
| 22..23 | Reserved | | non-VCL | non-VCL |
| 24..31 | Unspecified | | non-VCL | non-VCL |

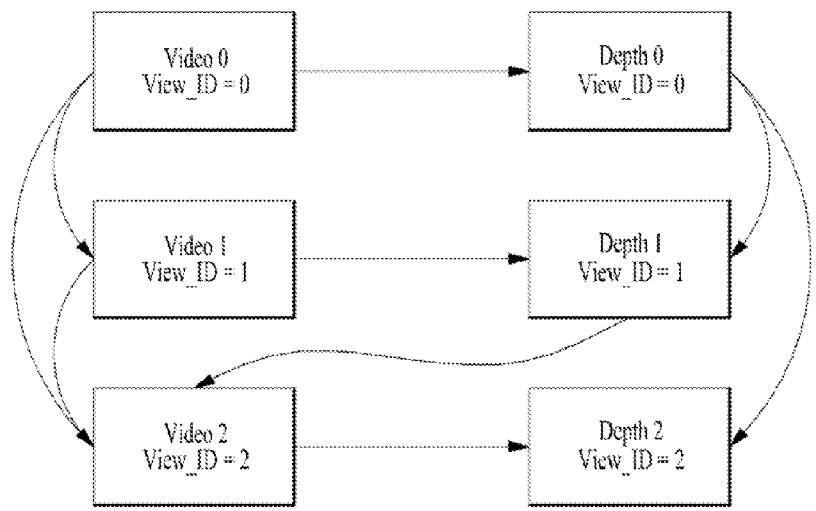

METHOD AND APPARATUS FOR TRANSCEIVING IMAGE COMPONENT FOR 3D IMAGE

CROSS REFERENCE TO RELATED APPLICATIONS

This application is the National Phase of PCT International Application No. PCT/KR2013/007226, filed on Aug. 12, 2013, which claims priority under 35 U.S.C. 119(e) to U.S. Provisional Application No. 61/681,633, filed on Aug. 10, 2012, all of which are hereby expressly incorporated by reference into the present application.

FIELD OF THE INVENTION

The present invention relates to a method and apparatus for providing a three-dimensional (3D) broadcast service. More specifically, the present invention relates to a method and apparatus for decoding texture image components and depth map image components that are required for 3D image rendering.

BACKGROUND ART

As the supply of 3D Television (3DTV) has become common, in addition to the supply of 3D content via storage media, the transmission of 3D image content via digital broadcasting is also becoming active.

Generally, a 3D image provides a 3D effect by using the principle of stereo view of both human eyes. Due to a parallax between both eye, in other words, due to a binocular parallax caused by a distance of approximately 65 mm between the eyes of a human being, man is capable of sensing depth perception, and, therefore, a 3D image provides a view allowing each of the user's left eye and right eye to view a respective flat image, thereby providing 3D effect and depth perception.

Such a 3D image display method includes a stereoscopic method, a volumetric method, a holographic methods, and so on. In case of the stereoscopic method, a left view image that is to be viewed by the left eye and a right view image that is to be viewed by the right eye are provided, and by allowing each of the left eye and the right eye to respectively view the left view image and the right view image through polarized glasses or the display device itself, the viewer may perceive a 3D image (or view) effect.

Meanwhile, in case a 3D content is viewed at home and not at a movie theater, locations (or positions) of a viewer may change (or vary) at all times. However, the current 3DTV receivers provide adequate 3D effects only when a 3D content is viewed at a fixed viewpoint or location (or position), and, therefore, in a standing point of the user, problems may occur in that the view is required to view the corresponding 3D content in limited locations (or positions).

DETAILED DESCRIPTION OF THE INVENTION

Technical Objects

In order to resolve the above-described problems, a technical object that is to be achieved by the present invention relates to allowing a viewer to freely select a wanted viewpoint and to consume 3D content while experiencing adequate 3D effects accordingly. More specifically, a technical object that is to be achieved by the present invention relates to providing an adequate broadcast signaling structure, so that a receiver can be capable of generating (or creating) virtual 3D images respective to each viewpoint, which may vary depending upon the viewer.

Technical Solutions

According to an exemplary embodiment of the present invention, a method for transmitting a view component for a 3D view includes a step of generating one or more texture view components and one or more depth map view components, a step of generating a supplemental enhancement information (SEI) message including a 3D hierarchy information element configured to signal hierarchy information related to coding between the one or more texture view components and one or more depth map view components, a step of generating a network abstraction layer (NAL) unit including the SEI message including the 3D hierarchy information element, and a step of generating a broadcast signal including the one or more texture components, the one or more depth map view components, and the NAL unit.

Preferably, the 3D hierarchy information element includes hierarchy view type information identifying whether a specific view component corresponds to a texture view component or to a depth map view component.

Preferably, the 3D hierarchy information element further includes hierarchy view identifier information indicating a viewpoint of the specific view component.

Preferably, the 3D hierarchy information element further includes embedded hierarchy view number information indicating a number of view components that are required to be decoded before decoding the specific view component.

Preferably, the 3D hierarchy information element further includes embedded hierarchy view type information identifying whether a view component that is to be decoded before the decoding of the specific view component corresponds to the texture view component or to the depth map view component, and coding priority index information indicating a decoding priority index of a view component that is to be decoded before the decoding of the specific view component.

Preferably, the method for transmitting a view component for a 3D view further includes a step of generating a SEI message including a GVR information element configured to signal information related to view component recovery by using a random access point, and a step of generating a NAL unit including a SEI message including the GVR information element.

Preferably, the GVR information element includes GVR identification information indicating whether or not a specific access unit corresponds to a GVR random access point, a 3D extended view number information indicating a number of view components incapable of being processed with decoding, in case a view component chronologically preceding a view component of a current time point does not exist, among view components having GVR applied thereto, and view identification information identifying view components incapable of being processed with decoding.

Preferably, the method for transmitting a view component for a 3D view includes a step of generating a SEI message including a 3D view dependency information element configured to signal a correlation between the texture view component and the depth map view component, and a step of generating a NAL unit including a SEI message including the 3D view dependency information element.

Preferably, the 3D view dependency information element includes information indicating whether or not the SEI message including the 3D view dependency information element provides information on all view components included in a 3D content.

According to an exemplary embodiment of the present invention, a view component receiving device for a 3D view includes a tuner configured to receive a broadcast signal including one or more texture view components, the one or more depth map view components, and the NAL unit, a demultiplexer configured to parse the NAL unit including a SEI (Supplemental Enhancement Information) message including a 3D hierarchy information element configured to signal hierarchy information related to coding between the one or more texture view components and the one or more depth map view components from the broadcast signal, and a view component decoder configured to decode the one or more texture view components and the one or more depth map view components by using the 3D hierarchy information element included in the SEI message.

Preferably, the 3D hierarchy information element includes hierarchy view type information identifying whether a specific view component corresponds to a texture view component or to a depth map view component.

Preferably, the 3D hierarchy information element further includes embedded hierarchy view number information indicating a number of view components that are required to be decoded before decoding the specific view component.

Preferably, the 3D hierarchy information element further includes embedded hierarchy view type information identifying whether a view component that is to be decoded before the decoding of the specific view component corresponds to a texture view component or a depth map view component, and coding priority index information indicating a decoding priority index of a view component that is to be decoded before the decoding of the specific view component.

Preferably, the demultiplexer further parses a NAL unit including a SEI message including a GVR information element configured to signal information related to view component recovery by using a random access point, and the view component decoder further uses the GVR information element, so as to decode the one or more texture view components and the one or more depth map view components, wherein the GVR information element includes GVR identification information indicating whether or not a specific access unit corresponds to a GVR random access point, a 3D extended view number information indicating a number of view components incapable of being processed with decoding, in case a view component chronologically preceding a view component of a current time point does not exist, among view components having GVR applied thereto, and view identification information identifying view components incapable of being processed with decoding.

Preferably, the multiplexer further parses a NAL unit including a SEI message including a 3D view dependency information element configured to signal a correlation between the texture view component and the depth map view component, and the view component decoder further uses the 3D view dependency information element, so as to decode the one or more texture view components and the one or more depth map view components, and wherein the 3D view dependency information element includes information indicating whether or not the SEI message including the 3D view dependency information element provides information on all view components included in a 3D content.

According to another exemplary embodiment of the present invention, a method for transmitting a view component for a 3D view includes a step of generating one or more texture view components and one or more depth map view components, a step of generating a 3D hierarchy information descriptor configured to signal hierarchy information related to coding between the one or more texture view components and one or more depth map view components, wherein the 3D hierarchy information descriptor includes hierarchy view type information identifying whether a specific view component corresponds to a texture view component or to a depth map view component, and embedded hierarchy view number information indicating a number of view components that are required to be decoded before decoding the specific view component, and a step of generating a broadcast signal including the one or more texture view components, the one or more depth map view components, and the 3D hierarchy information descriptor.

Preferably, the 3D hierarchy information descriptor is included in a program map table (PMT), a virtual channel table (VCT), or a service description table (SDT).

Preferably, the 3D hierarchy information descriptor further includes embedded hierarchy view type information identifying whether a view component that is to be decoded before the decoding of the specific view component corresponds to a texture view component or a depth map view component, and coding priority index information indicating a decoding priority index of a view component that is to be decoded before the decoding of the specific view component.

Effects of the Invention

According to the present invention, when the 3D effect (or volumetric effect) is intended to be adjusted, whenever required by the viewer, while viewing a 3D content, a new left view (or image) and right view (or image) may be created by the receiver, and, therefore, the 3D effect may be adjusted by using this combination.

Additionally, according to the present invention, a 3D content view (or image) may be created with respect to a random (or arbitrary) viewpoint in accordance with the viewpoint of the viewer of the 3D content.

Furthermore, according to the present invention, an adequate decoding may be performed with respect to a dependency between a texture view component and/or a depth map view component for 3D view rendering.

BRIEF DESCRIPTION OF THE DRAWINGS

FIG. 3 illustrates a coding mode for coding a 3D image according to an exemplary embodiment of the present invention.

FIG. 4 illustrates a structure of an encoder respective to a coding mode according to an exemplary embodiment of the present invention.

FIG. 6 illustrates a coding order of each image component within an access unit according to an exemplary embodiment of the present invention.

FIG. 7 illustrates a Gradual View Refresh (GVR) access unit according to an exemplary embodiment of the present invention.

FIG. 8 illustrates a decoding process using Gradual View Refresh (GVR) according to an exemplary embodiment of the present invention.

FIG. 9 illustrates a 3D view dependency descriptor according to an exemplary embodiment of the present invention.

FIG. 10 illustrates a description on values given to a depth_hor_upsampling_factor field and depth_ver_upsampling_factor field according to an exemplary embodiment of the present invention.

FIG. 11 illustrates a position of a 3D view dependency descriptor within a PMT according to an exemplary embodiment of the present invention.

FIG. 12 illustrates a 3D hierarchy descriptor according to an exemplary embodiment of the present invention.

FIG. 13 illustrates a description on values given to a hor_upsampling_factor field and ver_upsampling_factor field according to an exemplary embodiment of the present invention.

FIG. 14 illustrates a position of a 3D view dependency descriptor within a PMT according to an exemplary embodiment of the present invention.

FIG. 15 illustrates a significance respective to values of a stream_type field according to an exemplary embodiment of the present invention.

FIG. 16 illustrates signaling of a video level according to an exemplary embodiment of the present invention.

FIG. 17 illustrates a syntax of a SEI message in case 3D view dependency info is being transmitted through a SEI payload according to an exemplary embodiment of the present invention.

FIG. 18 illustrates a syntax of a SEI message in case 3D hierarchy info is being transmitted through a SEI payload according to an exemplary embodiment of the present invention.

FIG. 19 illustrates a syntax of a SEI message in case 3D hierarchy info is being transmitted through a SEI payload according to an exemplary embodiment of the present invention.

FIG. 20 illustrates details of a NAL unit and a syntax structure of RBSP respective to a nal_unit_type value according to an exemplary embodiment of the present invention.

FIG. 21 illustrates decoding operations of a receiver using 3D hierarchy Info according to an exemplary embodiment of the present invention.

FIG. 22 illustrates 3D hierarchy Info for the decoding operations of the receiver of FIG. 21 according to an exemplary embodiment of the present invention.

BEST MODE FOR CARRYING OUT THE PRESENT INVENTION

Figure 1:
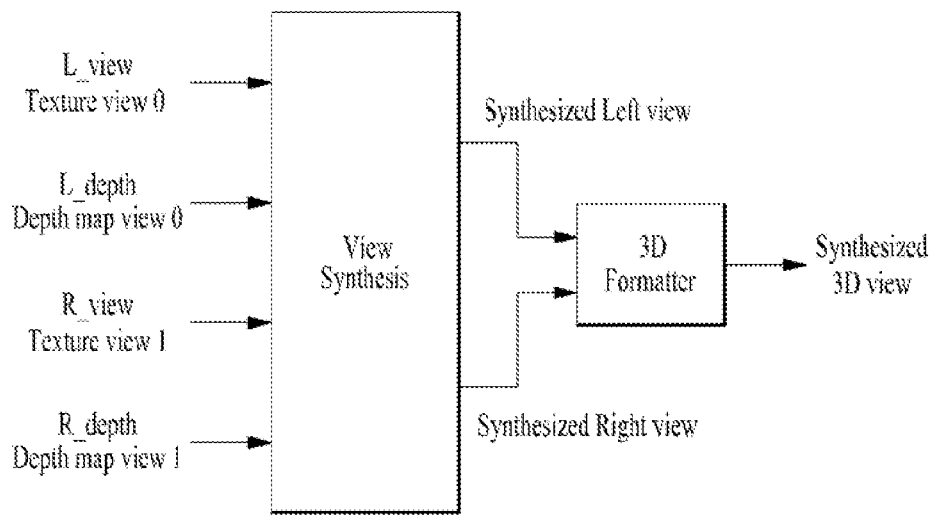
FIG. 1 illustrates part of a receiver configured to generate a 3D image at an arbitrary viewpoint according to an exemplary embodiment of the present invention.

Preferred exemplary embodiments of the present invention that can achieve a detailed realization of the following objects described below will be described in detail with reference to the accompanying drawings. At this point, the configuration and operation of the present invention that are illustrated in the drawings and described with respect to the drawings are merely described as at least one exemplary embodiment, and, therefore, the technical scope and spirit of the present invention and its essential configuration and operation will not be limited only to this.

In addition, wherever possible, although the terms used in the present invention are selected from generally known and used terms based upon functions of the present invention, the terms used herein may be varied or modified in accordance with the intentions or practice of anyone skilled in the art, or along with the advent of a new technology. Additionally, in some particular cases, some of the terms mentioned in the description of the present invention may be selected by the applicant at his or her discretion, the detailed meanings of which are described in relevant parts of the description of the present invention. Furthermore, it is required that the terms of the present invention are to be defined, not simply by the actual terms used but also by the meaning of each term lying within, and also based upon the overall content of the present invention.

FIG. 1 illustrates part of a receiver configured to generate a 3D image at an arbitrary viewpoint according to an exemplary embodiment of the present invention.

In order to generate (or create) a 3D image of an arbitrary (or random) viewpoint, a texture image (or texture view) configuring each of a left view (or left view video) and a right view (or right view video) of a stereo 3D content and a depth map image (or depth map view) respective to each texture image are required.

A texture image (or texture view) corresponds to an image view that is configured of pixels. Texture view 0 may be used in order to generate a left view that is required for playing a 3D content, and texture view 1 may be used in order to generate a right view that is required for playing a 3D content.

A depth map image (or depth map view) correspond to a view (or image) or data including information for providing a 3D effect on each of the left view image and the right view image, which configure the 3D content. The depth map view may include depth information respective to specific points within each image of the left view and the right view, which configure the 3D content. For example, the depth map view may include depth information respective to each of the pixels within the corresponding image, and the depth map view may also include depth information respective pixels of a specific unit. Alternatively, the depth map view may provide depth information respective to an object included in an image. The depth map view may include depth information respective to one or more viewpoints. More specifically, the depth map view may include at least one depth information respective to pixels, a group (or collection) of pixels, or objects within an image, and each depth information may correspond to depth information corresponding to each viewpoint.

A view synthesis unit (or image analysis unit) may generate a left view and a right view, which are included in the 3D content, by using texture views (a texture view for the left view, a texture view for the right view) and a depth map view. During the process of generating the left view and the right view, in addition to the depth map view, the view synthesis unit may use a camera parameter including environment information of the camera recording the corresponding 3D content. The camera parameter may include a distance between cameras, a distance between a camera and an object to be recorded, an angle between the cameras, a height of the cameras, and/or configuration information of the camera itself.

A 3D formatter generates a 3D image (or 3D view) by rendering a left view and a right view, which are generated from the view synthesis unit.

Figure 2:
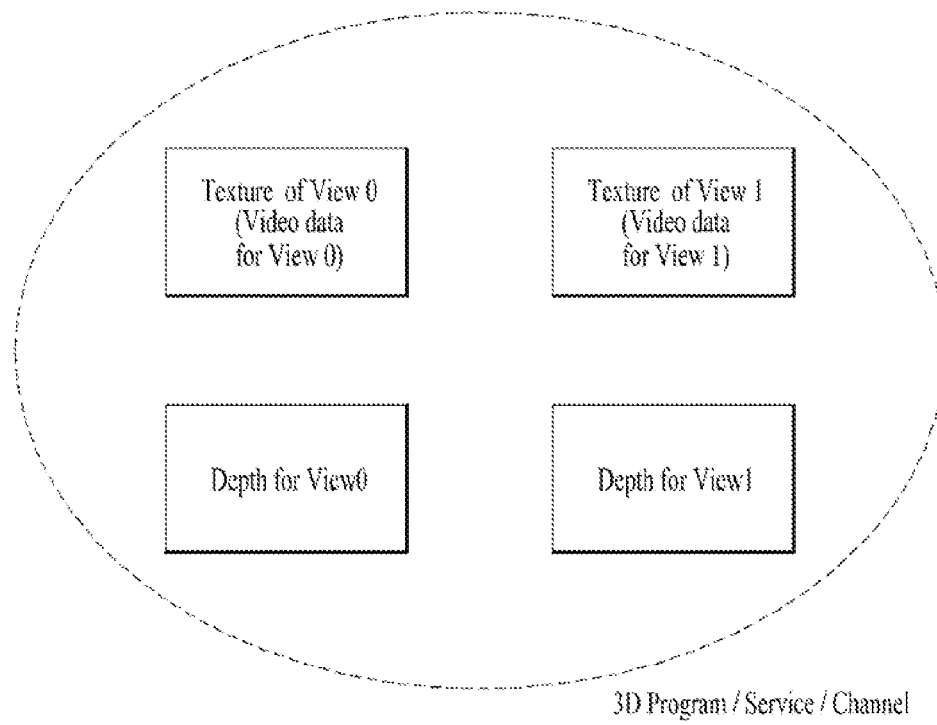
FIG. 2 illustrates video data and depth elements for a 3D content according to an exemplary embodiment of the present invention.

FIG. 2 illustrates video data and depth elements for a 3D content according to an exemplary embodiment of the present invention.

A texture view and depth information respective to the texture view may be provided for a program, service, or channel providing the 3D content.

In a broadcast service, the texture view and the depth information respective to the texture view may be provided in a program unit, a service unit, or a channel unit. Herein, the depth information may correspond to the above-described depth map view.

The receiver may be required to identify the texture view and the depth information respective to the texture view and may also be required to determine which depth information is to be applied to which texture view. Accordingly, respective signaling information may be required to be transmitted via broadcast signaling.

FIG. 3 illustrates a coding mode for coding a 3D image according to an exemplary embodiment of the present invention.

According to an exemplary embodiment of the present invention, a 3D image (or 3D view) may be coded by using AVC (Advanced Video Coding). And, according to another exemplary embodiment of the present invention, the 3D image may be coded by using MVC (Multiview Video Coding).

According to an exemplary embodiment of the present invention, the 3D image may be coded by using at least two modes.

A "3D High" mode corresponds to a mode wherein AVC and/or MVC, which used to be applied only to a texture view (or texture data), is/are also applied to depth data (or depth map view or depth information). In this mode, the texture view may be compatible with a MVC codec. At this point, a view (or image) of a base layer may be compatible with both AVC codec and MVC codec. According to this mode, coding of the texture view and coding of the depth data are performed independently.

A "3D Extended High" mode corresponds to a mode wherein, instead of having coding of the texture view and the depth data based upon AVC and/or MVC be performed independently, the coding is performed by influencing one another. In this mode, the texture view may be compatible with an AVC codec. At this point, a view (or image) of a base layer may be compatible with both AVC codec and MVC codec. Generally, this mode has a better coding efficiency as compared to the "3D High" mode.

FIG. 4 illustrates a structure of an encoder respective to a coding mode according to an exemplary embodiment of the present invention.

(a) of FIG. 4 illustrates the structure of an encoder respective to the "3D High" mode. Texture views (T0, T1) may be coded by using AVC and/or MVC. Depth data (D0, D1) may be coded by using AVC and/or MVC separately from the texture views, and, since no dependency exists between the depth data (D0, D1) and the texture views (T0, T1), each of the depth data (D0, D1) and the texture views (T0, T1) may be separately decoded.

(b) of FIG. 4 illustrates the structure of an encoder respective to the "3D Extended High" mode. The depth data (D0, D1) and the texture views (T0, T1) may be coded by using AVC and/or MVC. However, the coding of the texture views and the coding of the depth data are performed by having dependency between one another. Accordingly, the texture views and the depth data should be collectively decoded (or decoded along with one another).

According to the exemplary embodiment of the present invention, a base texture view (T0) may be compatible with the AVC codec in any mode.

Figure 5:
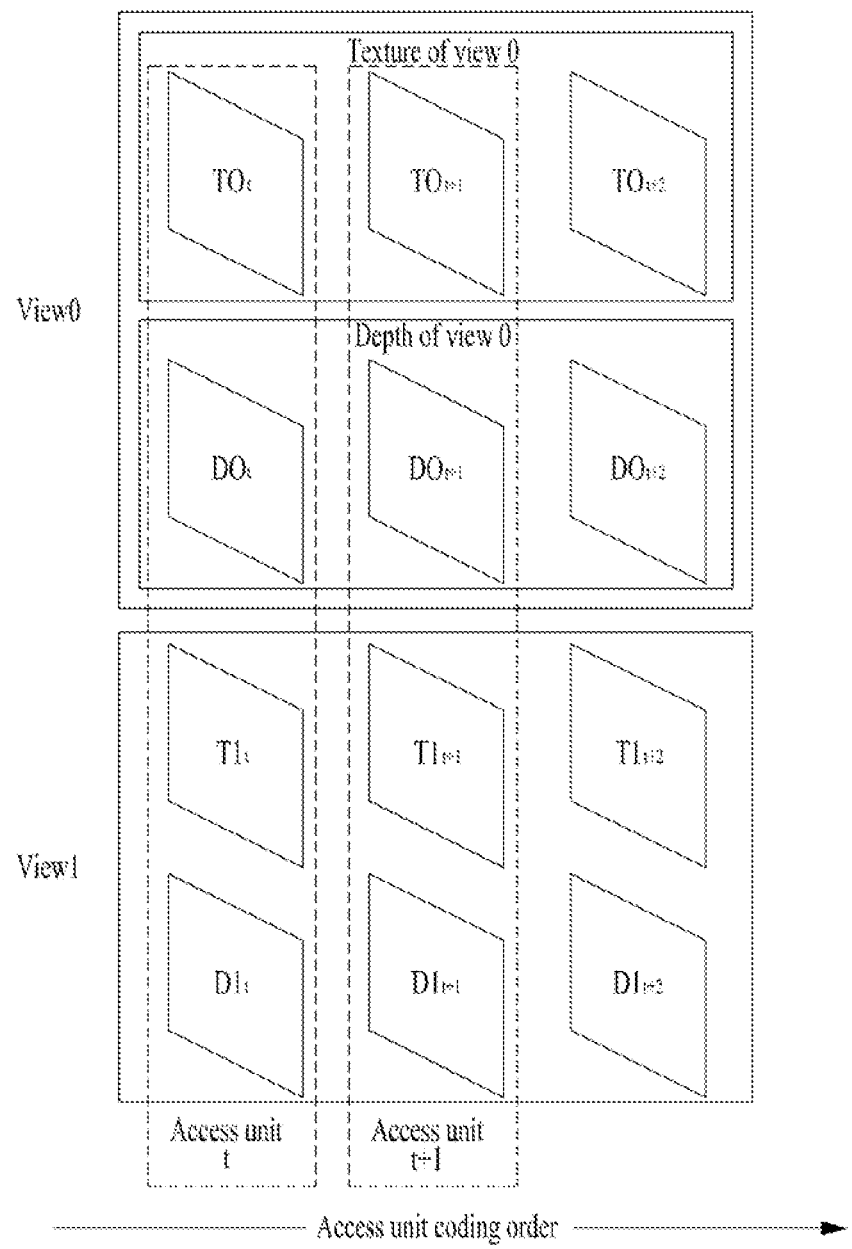
FIG. 5 illustrates an order of coding a texture image and a depth map image according to an exemplary embodiment of the present invention.

FIG. 5 illustrates an order of coding a texture image and a depth map image according to an exemplary embodiment of the present invention.

A bit stream may be encoded for each view component, and a decoding order may also be realized for each view component. More specifically, a texture view component for a left view (texture of view 0), a texture view component for a right view (texture of view 1), a depth map view for a left view (depth map view 0), and a depth map view for a right view (depth map view 1) may each be encoded and transmitted to a respective bit stream, and, before a processing on data of one view component is completed, the processing on data of another view component may not be performed.

A bit stream may be encoded for each access unit, and a decoding order may also be realized for each access unit. More specifically, one left view frame, one right view frame, one depth map frame for the left view, and one depth map frame for the right view may be included in one access unit, and such access unit may be encoded and transmitted to a respective bit stream. And, before a processing on data included in one access unit is completed, the processing on data included in another access unit may not be performed.

A texture view component of an AVC/MVC compatible view may be coded to be positioned before its respective depth view component. More specifically, texture view 0 (texture of view 0) may be coded to be positioned before any one of the view components respective to a specific viewpoint.

Encoding may be performed within one access unit in accordance with a dependency between a texture view component and a depth map component.

FIG. 6 illustrates a coding order of each image component within an access unit according to an exemplary embodiment of the present invention.

Referring to (a) of FIG. 6, texture view 0 is first encoded, and its dependent texture view 1 is encoded afterwards. Thereafter, depth map view 0 for texture view 0 is encoded, and its dependent depth map view 1 for texture view 1 is encoded afterwards. In this case, texture view 0 and texture view 1 may both correspond to AVC/MVC compatible texture views.

Referring to (b) of FIG. 6, texture view 0 is first encoded, and depth map view 0 for texture view 0 is encoded afterwards. Thereafter, texture view 1 being dependent to depth map view 0 is encoded, and, then, depth map view 1 for texture view 1 is encoded afterwards while being dependent to depth map view 0. In this case, texture view 0 and texture view 1 may both correspond to AVC/MVC compatible texture views.

Referring to (c) of FIG. 6, texture view 0 is first encoded, and depth map view 0 for texture view 0 is encoded afterwards. At this point, depth map view 0 may be dependent to texture view 0. Thereafter, depth map view 1 for texture view 1 is encoded. Depth map view 1 may be dependent to depth map view 0. Afterwards, texture view 1 is encoded. Texture view 1 may be dependent to texture view 0. And, texture view 1 may also be dependent to depth map view 1. In this case, although texture view 0 may be AVC/MVC compatible, texture view 1 may not be compatible with MVC.

In this description, the meaning that view B is dependent to view A may indicate that a specific element of view A may be used during the encoding process of view B. In this case, during the decoding process, view A should be decoded first in order to allow view B to be completely decoded.

For example, the encoding of view B may be performed by encoding data respective to a difference between an original (or initial) view A and an original (or initial) view B. Alternatively, the encoding of view B may be performed by encoding additional information on some of the pixels belonging to view A.

FIG. 7 illustrates a Gradual View Refresh (GVR) access unit according to an exemplary embodiment of the present invention.

GVR allows pre-selected viewpoints to be accurately decoded and allows the remaining viewpoints to be recovered by using a synthesis technology.

GVR corresponds to a type of random access point that can be used in 3D video coding, and GVR has greater compression efficiency as compared to Instantaneous Decoding Refresh (IDR), which corresponds to a random access point. Herein, in case data are received in-between bit sequences of view data (or image data), a random access point refers to a function allowing a view (or, frame) of the corresponding viewpoint or following the corresponding viewpoint to be played.

In case of IDR, in case the receiver accesses in-between the bit sequence in order to decode the corresponding bit sequence, the left view and right view configuring the 3D image (or 3D view) may be acquired at the corresponding viewpoint. Conversely, in case of GVR, in case the receiver accesses in-between the bit sequence in order to decode the corresponding bit sequence, the left view and right view cannot be immediately acquired at the corresponding viewpoint, and any one of the left view and the right view or a portion of the left view or right view may be acquired. Thereafter, all of the left view and the right view may be gradually acquired. More specifically, according to GVR, the receiver may acquire the whole (or complete) left view and the whole (or complete) right view starting from a specific viewpoint after the receiver has accessed the bit sequence.

Although inter prediction is not used in IDR and anchor access units, partial and limited inter prediction is used in GVR access units, and View synthesis is used.

Similarly to the case of Anchor access units, signaling of a GVR access unit may be transmitted through a SEI message and a NAL unit header.

Views belonging to each count may be recovered via prediction by using views belonging to a neighboring count.

In (a) and (b) of FIG. 7, views that are marked in dotted lines may each be defined as a GVR access unit. Frame P (View P) may be drawn from Frame I (View I) by one GVR access unit.

Referring to (b) of FIG. 7, Frame P for each of the left view and the right view may be acquired by using Frame I, which is included in one GVR access unit.

FIG. 8 illustrates a decoding process using Gradual View Refresh (GVR) according to an exemplary embodiment of the present invention.

Referring to FIG. 8, in case decoding is initiated from a GVR access unit (GVR access unit corresponding to Count 15), a texture view component and a depth map view component, to which inter prediction is not applied, are first decoded. "non-refreshed" views are recovered through view synthesis (e.g., depth-image-based rendering; DIBR). At this point, the view that is recovered via view synthesis may correspond to an approximate format of the initial (or original) view that has not been fully (or completely) recovered. In this case, after a predetermined period of time has passed, the whole (or complete) view may be recovered. For example, FIG. 8 corresponds to a case when the view is fully (or completely) recovered starting from the views corresponding to Count 30.

FIG. 9 illustrates a 3D view dependency descriptor according to an exemplary embodiment of the present invention.

A 3D view dependency descriptor according to the present invention may include a Program Map Table (PMT), a Virtual Channel Table (VCT), or an Event Information Table (EIT) of an ATSC system. Alternatively, the 3D view dependency descriptor may be transmitted by being included in a Service Description Table (SDT) or an Event Information Table (EIT) of a DVB system. Depending upon the table through which the 3D view dependency descriptor is being transmitted, signaling may be decided to be performed at any one of a service level, a program level, or an event level.

The 3D view dependency descriptor signals a connection relationship between a texture view and a depth map view, which are included in a broadcast program, a broadcast channel, or a broadcast service, and provides information on dependency in coding between each view.

Additionally, the 3D view dependency descriptor may include information indicating whether or not a GVR method is used as a random access point.

In case a view is recovered by using GVR, the receiver should be supported with a DIBR (depth-image-based rendering) function, and, accordingly, information on whether or not the GVR method is being used at the system level may also be provided. In this case, the corresponding information may also be transmitted through a SEI message or NAL unit header of the video data.

The 3D view dependency descriptor may include a 3D_mode field, a view_ID field, a view_PID field, an independent_texture_coding_flag field, an existence_of_corresponding_depth field, a depth_PID field, a depth_hor_upsampling_factor field, a depth_ver_upsampling_factor field, a GVR_included field, and/or a cam_param_included field.

The 3D_mode field corresponds to a field indicating coding dependency information between a texture view and a depth map view. For example, when this field is equal to 0, this indicates the "3D High" mode (a case when the texture view and the depth map view are independently coded), and, when this field is equal to 1, this indicates the "3D Extended High" mode (a case when dependency is established between the texture view and the depth map view so as to enhance the coding efficiency).

In case of the "3D High" mode, a receiver that wishes to acquire only the texture view may be capable of decoding the texture view without having to decode the depth map view.

In case of the "3D Extended High" mode, since dependency exists, independent decoding may not be performed on the texture view and the depth map view. More specifically, when the receiver decodes the texture view, the receiver is required to use a decoding result of the depth map view. Alternatively, when the receiver decodes the depth map view, the receiver is required to use a decoding result of the texture view.

The view_ID field corresponds to an identifier (view identifier) notifying a viewpoint of a texture view component. In case a depth map view component corresponding to the texture view component exists, the components may be interconnected so that a view_ID value respective to the depth map view component can have the same value as a view_ID value of the texture view component.

The view_PID field corresponds to a PID value of an ES stream transmitting a texture view component.

The independent_texture_coding_flag field indicates whether or not independent coding may be performed on each texture view. For example, since independent coding may be performed on texture view 0 (T0) by default, this field will not be necessary, and, in case this field is used, this field is given the value of '1' in all cases. With respect to the remaining texture views (e.g., T1), it may be determined through this field whether or not independent decoding can be performed.

The existence_of_corresponding_depth field corresponds to a field indicating whether or not a depth map view component corresponding to the texture view component is being signaled. For example, when the value of this field is equal to '0', this indicates that only the texture view component exists, and, when the value of this field is equal to '1', this indicates that both the texture view component and the depth map view component exist.

As a value that is being signaled in case the existence_of_corresponding_depth field is equal to '1', the depth_PID field corresponds to a PID value of an ES stream, which transmits depth map view component corresponding to the texture view component.

The depth_hor_upsampling_factor field corresponds to a field notifying information on a horizontal upsampling factor, which is required for recovering a view (or image), after the depth map view component corresponding to the texture view component is decoded.

The depth_ver_upsampling_factor field corresponds to a field notifying information on a vertical upsampling factor, which is required for recovering a view (or image), after the depth map view component corresponding to the texture view component is decoded.

In case a Reduced-resolution depth coding Tool is used, a transmitting end may rescale the resolution of the depth map view component and may then transmit the processed component. In this case, during 3D view synthesis, a receiving end may require a rescale process to be performed when applying the corresponding depth map view, and, at this point, processing may be performed by referring to the upscaling factor (e.g., the depth_hor_upsampling_factor field or the depth_ver_upsampling_factor field). Whenever required, such upsampling factor may also be designated with respect to the texture view component.

Values that can be assigned to the depth_hor_upsampling_factor field and/or the depth_ver_upsampling_factor field and the respective description will hereinafter be described in detail.

The GVR_included field indicates whether or not a view can be recovered by using the GVR method. For example, when the GVR_included field is equal to 0, this indicates that a GVR picture is included in a program, channel, or service, and, when the GVR_included field is equal to 1, this indicates that a GVR picture is not included in a program, channel, or service. Since the GVR can be used as the random access point only when the DIBR function is being provided to the receiving end, a receiver that does not support DIBR may determine in advance, by using this field value, whether or not random access points of the current program, channel, or service are all available for access (or accessible).

The cam_param_included field corresponds to a field notifying whether or not a camera parameter is being signaled with respect to a specific view. If the GVR is intended to be used as a Random access point, the camera parameter may be required. In this case, the receiver may be informed of whether or not GVR support is available through this field. Generally, when a broadcasting station sends out a GVR, a camera parameter may also be transmitted. However, in case the camera parameter is transmitted through a separate path other than a video header, the receiver may be capable of identifying with certainty whether or not a camera parameter is being provided through this field.

Signaling may be performed on all texture views, or signaling may be performed on only some of the texture views by using a for loop of a texture view included in the 3D View dependency descriptor. In case signaling is performed on all texture views, a num_of_views field may be included in the 3D View dependency descriptor, so as to allow the for loop to be performed as many times as the number of views.

In case the 3D_mode field is equal to 1, i.e., in case of the "3D Extended High" mode, a solution for notifying hierarchy information between the view components with respect to the decoding order is being required. More specifically, a signaling solution notifying dependency information between the texture view component and the depth map view component, which are included in the program, channel, or service, at the system level is being required, and, as such solution, a solution for extending a Hierarchy_descriptor, which corresponds to a descriptor of a legacy (or conventional) MPEG-2 system, or a solution for performing signaling by including related information in the 3D View dependency descriptor, or a solution for performing signaling by separately designating a 3D hierarchy descriptor may be used. A more detailed description will be provided later on.

FIG. 10 illustrates a description on values given to a depth_hor_upsampling_factor field and depth_ver_upsampling_factor field according to an exemplary embodiment of the present invention.

A value being assigned to the depth_hor_upsampling_factor field indicates that the corresponding upsampling factor is being applied along a horizontal direction of the view frame, and a value being assigned to the depth_ver_upsampling_factor field indicates that the corresponding upsampling factor is being applied along a vertical direction of the view frame.

In case the value of the depth_hor_upsampling_factor field or depth_ver_upsampling_factor field is equal to '0001', the decoder may separately verify the information being included in a video elementary stream and may acquire accurate upsampling factor information.

When the value of the depth_hor_upsampling_factor field or depth_ver_upsampling_factor field is equal to '0010', this indicates that the coding resolution respective to the depth map view component is identical to the coding resolution of the texture view component.

When the value of the depth_hor_upsampling_factor field or depth_ver_upsampling_factor field is equal to '0011', this indicates that the coding resolution respective to the depth map view component corresponds to ¾ of the coding resolution of the texture view component.

When the value of the depth_hor_upsampling_factor field or depth_ver_upsampling_factor field is equal to '0100', this indicates that the coding resolution respective to the depth map view component corresponds to ⅔ of the coding resolution of the texture view component.

When the value of the depth_hor_upsampling_factor field or depth_ver_upsampling_factor field is equal to '0101', this indicates that the coding resolution respective to the depth map view component corresponds to ½ of the coding resolution of the texture view component.

FIG. 11 illustrates a position of a 3D view dependency descriptor within a PMT according to an exemplary embodiment of the present invention.

The Program Map Table PMT according to the present invention includes the following.

A table_id field, a section_syntax_indicator field, a section_length field, a program_number field, a version_number field, a current_ next_ indicator field, a section_number field, a last_section_number field, a PCR_PID field, a program_info_length field, a stream_type field, an elementary_PID field, an ES_info_length field, and/or a CRC_32 field may be included.

The table_id field is an 8-bit field, which may be set to have a value of 0x02 in order to indicate a TS_program_map_section.

The section_syntax_indicator field is a 1-bit field, which may be set to 1.

The section_length field is configured of 12 bits, wherein the first two bits are set to 00. This field indicates the number of bytes of a section and indicates a length starting from immediately after this field and up to the CRC.

The program_number field is configured of 16 bits. This indicates to which program a program_map_PID is applicable (or available for application). The definition of one program is transmitted only by a single TS_program_map_section.

The version_number field indicates a version of a Virtual Channel. Each time a change occurs in the PMT, the version_number field is incremented by 1. When the version value reaches 31, the next version value is equal to 0. The value of this field may have the same value as the same field value of a MGT.

The current_next_indicator field is configured of 1 bit, and, in case the VCT is currently available for application, this field is set to 1. If this field is set to 0, this indicates that the VCT cannot yet be applied and that a next table is valid.

The section_number field identifies a number of a section. For example, the value of this field for the PMT is set to 0x00.

The last_section_number field identifies a number of a last section. For example, the value of this field for the PMT is set to 0x00.

The PCR_PID field is configured of 13 bits, and this field signifies a PID of a TS including a valid PCR field with respect to a program, which is described above by a program number.

The program_info_length field may be configured of 12 bits, wherein the first two bits are set to have the value of 00. The remaining 10 bits indicates a descriptor immediately following this field in a number of bytes.

The stream_type field may be configured of 8 bits, and this field indicates a type of a program element, which is being transmitted by a packet having a PID value of an elementary (or basic) PID.

The elementary_PID field may be configured of 13 bits, and this field indicates a PID of a TS being included in a related program element.

The ES_info_length field may be configured of 12 bits, wherein the first two bits are set to 00. The remaining 10 bits indicates a descriptor of a related program element, which immediately follows this field, in a number of bytes.

According to the exemplary embodiment of the present invention, a descriptor immediately following the ES_info_length field may correspond to a 3DTV service location descriptor.

The CRC_32 field indicates a CRC value for a zero output of a register within a decoder.

According to an exemplary embodiment of the present invention, the 3D view dependency descriptor may be included in an area, wherein a program level descriptor within the PMT can be positioned. More specifically, the 3D view dependency descriptor may be included in a for loop, which follows the program_info_length field.

Although it is not shown in the drawing, in case the 3D view dependency descriptor is being transmitted through the VCT, the 3D view dependency descriptor may be positioned in a channel level descriptor loop of the VCT.

Although it is not shown in the drawing, in case the 3D view dependency descriptor is being transmitted through the SDT, the 3D view dependency descriptor may be positioned in a channel level descriptor loop of the SDT, and settings may be made so that information on all views can be included in the 3D view dependency descriptor.

FIG. 12 illustrates a 3D hierarchy descriptor according to an exemplary embodiment of the present invention.

The 3D hierarchy descriptor includes coding related hierarchy information of the texture view component and the depth map view component, which configure a program, in a broadcasting system based upon 3D video coding.

The 3D hierarchy descriptor may be positioned at an elementary stream level of a PMT, and, in this case, the 3D hierarchy descriptor may include information on a view component, which is required when decoding the corresponding ES stream.

The 3D hierarchy descriptor according to the exemplary embodiment of the present invention may include a hierarchy_view_type field, a hierarchy_view_ID field, a num_hierarchy_embedded_views field, a hierarchy_embedded_view_type field, a hierarchy_embedded_view_ID field, a coding_priority_index field, a hor_upsampling_factor field, and/or a ver_upsampling_factor field.

The hierarchy_view_type field corresponds to a field notifying a type of the view component. For example, when the value of this field is equal to '0', this indicates that the view component corresponds to a texture view component, and, when the value of this field is equal to '1', this indicates that the view component corresponds to a depth map view component.

The hierarchy_view_ID field corresponds to an identifier (view identifier) notifying a viewpoint of a view component.

The num_hierarchy_embedded_views field corresponds to a field indicating a number of view components that are to be decoded firsthand before decoding the view component. For example, in case dependency exists between the view components, view components that are required for decoding the current view component may exist, and, at this point, the receiver may be informed of the number of such required view components through the num_hierarchy_embedded_views field.

The hierarchy_embedded_view_type field corresponds to a field indicating the type of a view component that is to be decoded firsthand before decoding the view component. For example, if the value of the hierarchy_embedded_view_type field is equal to '0', this indicates that the view component corresponds to a texture view component, and, if the value of the hierarchy_embedded_view_type field is equal to '1', this indicates that the view component corresponds to a depth map view component.

The hierarchy_embedded_view_ID field corresponds to an identifier (view identifier) notifying a viewpoint of a view component that is to be decoded firsthand before decoding the view component. Through the hierarchy_embedded_ view_ID field, the receiver may find a view component that is required for decoding the current view component. Alternatively, the receiver may find a required view component by using a combination of the hierarchy_embedded_view_type field and the hierarchy_embedded_view_ID field.

The coding_priority_index field corresponds to a field indicating decoding priority levels of view components that are to be decoded firsthand before decoding the view component. This field may also be replaced with a view_index field value. This field corresponds to a field for signaling priority levels respective to when 2 or more streams are to be decoded firsthand.

The hor_upsampling_factor field corresponds to a field notifying information on a horizontal upsampling factor, which is required for recovering a view component, after the view component is decoded.

The ver_upsampling_factor field corresponds to a field notifying information on a vertical upsampling factor, which is required for recovering a view component, after the view component is decoded.

In case a Reduced-resolution coding Tool is used, a transmitting end may rescale the resolution of the view component and may then transmit the processed component. During 3D view synthesis, a receiving end may require a rescale process to be performed when applying the corresponding view component, and the processing may be performed by referring to the upscaling factor (e.g., the hor_upsampling_factor field and/or the ver_upsampling_factor field).

Values of the depth_hor_upsampling_factor field and/or the depth_ver_upsampling_factor field will hereinafter be described in detail.

FIG. 13 illustrates a description on values given to a hor_upsampling_factor field and ver_upsampling_factor field according to an exemplary embodiment of the present invention.

A value being assigned to the hor_upsampling_factor field indicates that the corresponding upsampling factor is being applied along a horizontal direction of the view frame, and a value being assigned to the ver_upsampling_factor field indicates that the corresponding upsampling factor is being applied along a vertical direction of the view frame.

In case the value of the hor_upsampling_factor field or ver_upsampling_factor field is equal to '0001', the decoder may separately verify the information being included in a video elementary stream and may acquire accurate upsampling factor information.

When the value of the hor_upsampling_factor field or ver_upsampling_factor field is equal to '0010', this indicates that the coding resolution respective to the view component is identical to the coding resolution of the base texture view component.

When the value of the hor_upsampling_factor field or ver_ upsampling_factor field is equal to '0011', this indicates that the coding resolution respective to the view component corresponds to ¾ of the coding resolution of the base texture view component.

When the value of the hor_upsampling_factor field or ver_upsampling_factor field is equal to '0100', this indicates that the coding resolution respective to the view component corresponds to ⅔ of the coding resolution of the base texture view component.

When the value of the hor_upsampling_factor field or ver_upsampling_factor field is equal to '0101', this indicates that the coding resolution respective to the view component corresponds to ½ of the coding resolution of the base texture view component.

FIG. 14 illustrates a position of a 3D view dependency descriptor within a PMT according to an exemplary embodiment of the present invention.

The description of each field included in the PMT will be replaced with the same description provided above.

According to the exemplary embodiment of the present invention, the 3D view dependency descriptor may be included in an area where a Program lever descriptor of the PMT is located.

In this case, with respect to 3D coding, a newly added stream_type field may also be newly designated and signaled. More specifically, since the streams that are related to 3D coding correspond to new streams that do not exist in the conventional AVC/MVC, a value of the new stream_type field is assigned, so that receivers that are only compatible with the conventional AVC/MVC can be designed to ignore (or disregard) streams corresponding to the specific stream_type field value, and, accordingly, backward compatibility may be maintained between the new signaling system and the conventional (or legacy) system.

FIG. 15 illustrates a significance respective to values of a stream_type field according to an exemplary embodiment of the present invention.

3D video coding may be broadly divided into three different aspects corresponding to 3D enhancement stream.

Firstly, an AVC/MVC compatible depth map view component may exist. At this point, whenever required, the AVC/MVC compatible depth map view component may be divided into an AVC compatible depth map view component and an MVC compatible depth map view component.

Secondly, an AVC/MVC non-compatible texture view component may exist.

Thirdly, an AVC/MVC non-compatible depth map view component may exist.

In case the view component, which is transmitted by a stream, corresponds to an AVC compatible depth map view component, the value of the stream_type field may be set to '0x24'.

In case the view component, which is transmitted by a stream, corresponds to an MVC compatible depth map view component, the value of the stream_type field may be set to '0x25'.

In case the view component, which is transmitted by a stream, corresponds to an AVC/MVC non-compatible texture view component, the value of the stream_type field may be set to '0x26'. In this case, the stream_type field may indicate that the texture view component corresponds to a component that is coded by a new method, which is not compatible with AVC or MVC. For example, the texture view component may correspond to component that is coded with inter-layer prediction by using a depth map view component.

In case the view component, which is transmitted by a stream, corresponds to an AVC/MVC non-compatible depth map view component, the value of the stream_type field may be set to '0x27'. In this case, the stream_type field may indicate that the depth map view component corresponds to a component that is coded by a new method, which is not compatible with AVC or MVC. For example, the depth map view component may correspond to component that is coded with inter-layer prediction by using a texture view component.

Although it is not shown in the drawing, the 3D Hierarchy descriptor may be transmitted through a VCT. Essentially, the 3D Hierarchy descriptor may be designed to have the same functions as the 3D Hierarchy descriptor, which is defined in the PMT as described above, and the following features may be additionally taken into consideration.

In case the 3D Hierarchy descriptor is included in the VCT, since this corresponds to a channel level descriptor, the 3D Hierarchy descriptor corresponds to a different level from that of the above-described 3D Hierarchy descriptor of the PMT, which performs signaling for each element stream. More specifically, the 3D Hierarchy descriptor being included in the PMT may be required to have a configuration that is different from that of an ES level descriptor. Therefore, in order to signal characteristics respective to each of the multiple streams included in a channel, a method of listing the characteristics respective to each component by including a for loop in the 3D Hierarchy descriptor, and so on, may be used, and, at this point, fields that are commonly applied to all of the streams may be listed outside of the for loop.

Additionally, apart from the fields being included in the 3D Hierarchy descriptor of the PMT, as defined above, a field indicating a PID value of a stream shall be included in the 3D Hierarchy descriptor. In this case, by using the additionally included field, the receiver may be capable of determining to which ES stream the information, which is newly added to the 3D Hierarchy descriptor, is being applied.

Although it is not shown in the drawing, the 3D Hierarchy descriptor may be transmitted through a SDT. In this case, essentially, the 3D Hierarchy descriptor may be designed to have the same functions as the 3D Hierarchy descriptor, which is defined in the PMT as described above, and the following features may be additionally taken into consideration.

In case the 3D Hierarchy descriptor is designated to the SDT, since the 3D Hierarchy descriptor corresponds to a service level descriptor, the 3D Hierarchy descriptor corresponds to a different level from that of the above-described 3D Hierarchy descriptor of the PMT, which performs signaling for each element stream. More specifically, the 3D Hierarchy descriptor being included in the PMT may be required to have a configuration that is different from that of an ES level descriptor. Therefore, in order to signal characteristics respective to each of the multiple streams included in a channel, a method of listing the characteristics respective to each component by including a for loop in the 3D Hierarchy descriptor, and so on, may be used, and, at this point, fields that are commonly applied to all of the streams may be listed outside of the for loop.

Additionally, apart from the fields being included in the 3D Hierarchy descriptor of the PMT, as defined above, a field including a component_tag value of the corresponding stream may be added. By using this field, the receiver may be capable of determining to which ES stream the information, which is newly added to the 3D Hierarchy descriptor, is being applied.

Details corresponding to the stream_type field, which is newly designated in the above-described PMT, may be newly designated and signaled so as to be indicated as a combination of a stream_content field and a component_type field of a component descriptor.

FIG. 16 illustrates signaling of a video level according to an exemplary embodiment of the present invention.

According to the exemplary embodiment of the present invention, the above-described information included in the 3D View dependency descriptor, information included in the 3D Hierarchy descriptor, and/or information related to GVR may be transmitted as a video level.

For example, in case of a H.264 (or AVC) video, the corresponding information may be transmitted to a SEI (Supplemental Enhancement Information) area including information supplementing processes, such as decoding and outputting, and so on.

At this point, a 3D_view_dependency_info SEI message, a 3D_hierarchy_info SEI message, and a GVR_info SEI message, which are included in the video level in order to transmit information, such as 3D View dependency Info, 3D Hierarchy Info, and GVR Info, may each be designated in the SEI, or at least two or more of the 3D View dependency Info, the 3D Hierarchy Info, and the GVR Info may be integrated to a single SEI message and may then be designated.

In case the 3D View dependency Info, the 3D Hierarchy Info, and the GVR Info is respectively transmitted through each SEI message, details on which type of information is being included in a SEI payload may be signaled by using a value of a payloadType element. For example, in case the payloadType element value is equal to '48', this may indicate that the 3D View dependency info is being transmitted through the SEI payload. In case the payloadType element value is equal to '49', this may indicate that the 3D hierarchy info is being transmitted through the SEI payload. In case the payloadType element value is equal to '50', this may indicate that the GVR info is being transmitted through the SEI payload. Furthermore, a payloadSize element may signal a size of the information being included in the SEI payload.

FIG. 17 illustrates a syntax of a SEI message in case 3D view dependency info is being transmitted through a SEI payload according to an exemplary embodiment of the present invention.

According to the exemplary embodiment of the present invention, the SEI message transmitting the 3D view dependency info may include a 3D_view_dependency_info_id field, a 3D_complete_views_or_not_flag field, a 3D_mode field, a view_ID field, an independent_texture_coding_flag field, an existence_of_corresponding_depth field, a GVR_included field, and/or a cam_param_included field.

The 3D_view_dependency_info_id field indicates an identification number for identifying an information combination included in the SEI message, which is configured to transmit the 3D view dependency info.

The 3D_complete_views_or_not_flag field corresponds to a field that indicates whether or not the details included in the SEI message are being applied to all views included in the current program (or channel, or service, or operation point).

The 3D_mode field corresponds to a field indicating coding dependency information between a texture view and a depth map view. For example, when this field is equal to 0, this indicates the "3D High" mode (a case when the texture view and the depth map view are independently coded), and, when this field is equal to 1, this indicates the "3D Extended High" mode (a case when dependency is established between the texture view and the depth map view so as to enhance the coding efficiency).

In case of the "3D High" mode, a receiver that wishes to acquire only the texture view may be capable of decoding the texture view without having to decode the depth map view.

In case of the "3D Extended High" mode, since dependency exists, independent decoding may not be performed on the texture view and the depth map view. More specifically, when the receiver decodes the texture view, the receiver is required to use a decoding result of the depth map view. Alternatively, when the receiver decodes the depth map view, the receiver is required to use a decoding result of the texture view.

The view_ID field corresponds to an identifier (view identifier) notifying a viewpoint of a texture view component. In case a depth map view component corresponding to the texture view component exists, the components may be interconnected so that a view_ID value respective to the depth map view component can have the same value as a view_ID value of the texture view component.

The independent_texture_coding_flag field indicates whether or not independent coding may be performed on each texture view. For example, since independent coding may be performed on texture view 0 (T0) by default, this field will not be necessary, and, in case this field is used, this field is given the value of '1' in all cases. With respect to the remaining texture views (e.g., T1), it may be determined through this field whether or not independent decoding can be performed.

The existence_of_corresponding_depth field corresponds to a field indicating whether or not a depth map view component corresponding to the texture view component is being signaled. For example, when the value of this field is equal to '0', this indicates that only the texture view component exists, and, when the value of this field is equal to '1', this indicates that both the texture view component and the depth map view component exist.

The GVR_included field indicates whether or not a view can be recovered by using the GVR method. For example, when the GVR_included field is equal to 0, this indicates that a GVR picture is included in a program, channel, or service, and, when the GVR_included field is equal to 1, this indicates that a GVR picture is not included in a program, channel, or service. Since the GVR can be used as the random access point only when the DIBR function is being provided to the receiving end, a receiver that does not support DIBR may determine in advance, by using this field value, whether or not random access points of the current program, channel, or service are all available for access (or accessible).

The cam_param_included field corresponds to a field notifying whether or not a camera parameter is being signaled with respect to a specific view. If the GVR is intended to be used as a Random access point, the camera parameter may be required. In this case, the receiver may be informed of whether or not GVR support is available through this field. Generally, when a broadcasting station sends out a GVR, a camera parameter may also be transmitted. However, in case the camera parameter is transmitted through a separate path other than a video header, the receiver may be capable of identifying with certainty whether or not a camera parameter is being provided through this field.

FIG. 18 illustrates a syntax of a SEI message in case 3D hierarchy info is being transmitted through a SEI payload according to an exemplary embodiment of the present invention.

According to the exemplary embodiment of the present invention, the SEI message transmitting the 3D hierarchy info may include a 3D_hierarchy_info_id field, a hierarchy_view_type field, a hierarchy_view_ID field, a num_hierarchy_embedded_views field, a hierarchy_embedded_view_type field, a hierarchy_embedded_view_ID field, and/or a coding_priority_index field.

The 3D_hierarchy_info_id field indicates an identification number for identifying an information combination included in the SEI message, which is configured to transmit the 3D hierarchy info.

The hierarchy_view_type field corresponds to a field notifying a type of the view component. For example, when the value of this field is equal to '0', this indicates that the view component corresponds to a texture view component, and, when the value of this field is equal to '1', this indicates that the view component corresponds to a depth map view component.

The hierarchy_view_ID field corresponds to an identifier (view identifier) notifying a viewpoint of a view component.

The num_hierarchy_embedded_views field corresponds to a field indicating a number of view components that are to be decoded firsthand before decoding the view component. For example, in case dependency exists between the view components, view components that are required for decoding the current view component may exist, and, at this point, the receiver may be informed of the number of such required view components through the num_hierarchy_embedded_views field.

The hierarchy_embedded_view_type field corresponds to a field indicating the type of a view component that is to be decoded firsthand before decoding the view component. For example, if the value of the hierarchy_embedded_view_type field is equal to '0', this indicates that the view component corresponds to a texture view component, and, if the value of the hierarchy_embedded_view_type field is equal to '1', this indicates that the view component corresponds to a depth map view component.

The hierarchy_embedded_view_ID field corresponds to an identifier (view identifier) notifying a viewpoint of a view component that is to be decoded firsthand before decoding the view component. Through the hierarchy_embedded_view_ID field, the receiver may find a view component that is required for decoding the current view component. Alternatively, the receiver may find a required view component by using a combination of the hierarchy_embedded_view_type field and the hierarchy_embedded_view_ID field.

The coding_priority_index field corresponds to a field indicating decoding priority levels of view components that are to be decoded firsthand before decoding the view component. This field may also be replaced with a view_index field value. This field corresponds to a field for signaling priority levels respective to when 2 or more streams are to be decoded firsthand.

FIG. 19 illustrates a syntax of a SEI message in case GVR info is being transmitted through a SEI payload according to an exemplary embodiment of the present invention.

In a legacy TV, wherein 3D video decoding is impossible, since only the streams that are compatible at a GVR point can be outputted, the GVR does not operate as the random access point.

Conversely, in a 3DTV that is not supported with 3D video coding and 3D view synthesis, since a view corresponding to an enhancement stream is generated at a GVR point via view synthesis, the GVR operates as a Random access point.

At this point, in a 3DTV that is supported with 3D view synthesis, whether or not a 3D view corresponds to a GVR picture may be known through a GVR Info SEI message.

The GVR Info SEI message may be signaled in a format of being attached to each Access Unit, which corresponds to a GVR Random Access Point, and the GVR Info SEI message may indicate which view cannot be outputted (or is unavailable for output) by performing only the decoding process (i.e., the ID of a view that can be acquired by the receiver only by performing recovery using DIBR) within the corresponding Access unit.

The GVR Info SEI message includes a GVR_flag field, a number_3D_extended_views field, and/or a view_ID field.

The GVR_flag field identifies whether or not the 3D view corresponds to a GVR picture. More specifically, when the value of the GVR_flag field is equal to '1', this indicates that the corresponding Access Unit is a GVR Random Access Point.

The number_3D_extended_views field corresponds to a field indicating a number of views on which decoding cannot be performed, when there are no chronologically preceding pictures other than a view of a current time point within the GVR. Alternatively, the number_3D_extended_views field indicates a number of views that can be recovered only by applying DIBR. The number_3D_extended_views field may provide information on a number of views that should be further decoded in order to acquire a complete (or whole) view.

The view_ID field corresponds to an identifier (view identifier) notifying a viewpoint of a view component. The view_ID field performs a function of identifying views to which DIBR is to be applied, while iterating the for loop for as many times as the number of views being identified by the number_3D_extended_views field. Alternatively, the view_ID field performs a function of identifying views that cannot be completely recovered, while iterating the for loop for as many times as the number of views being identified by the number_3D_extended_views field.

FIG. 20 illustrates details of a NAL unit and a syntax structure of RBSP respective to a nal_unit_type value according to an exemplary embodiment of the present invention.

According to another exemplary embodiment of the present invention, a value for a NAL unit of an enhanced layer may be newly assigned to the nal_unit_type value of the NAL unit header. Therefore, by preventing the legacy receiver from recognizing the corresponding value, settings may be made so that the 3D View dependency Info, the 3D Hierarchy Info, and/or the GVR Info can be prevented from being used by the legacy receiver.

According to another exemplary embodiment of the present invention, information being signaled by the 3D View dependency Info SEI message, the 3D Hierarchy Info SEI message, and/or the GVR Info SEI message may be defined to have a format, such as a nal_unit_header_3D_extension( ) and may then be signaled through a nal_unit_header. A case when a nal_unit_type value is equal to 21 may be newly defined, and, in this case, the 3D View dependency Info SEI message, the 3D Hierarchy Info SEI message, and/or the GVR Info SEI message may be included in the NAL Unit and then transmitted.

In case the 3D View dependency Info, the 3D Hierarchy Info, and/or the GVR Info are transmitted in SEI message formats at the video level, in order to notify information related to 3D View dependency/3D Hierarchy/GVR, the receiver may be operated as described below.

The receiver may receive the 3D View dependency Info, the 3D Hierarchy Info, and/or the GVR Info through a SEI RBSP (raw byte sequence payload).

The receiver parses an AVC NAL unit, and, when the nal_unit_type value is equal to 6, the receiver recognizes the information as SEI data, and, by reading a 3D View dependency Info SEI message having the payloadType of 48, the receiver uses the corresponding information.

The receiver parses an AVC NAL unit, and, when the nal_unit_type value is equal to 6, the receiver recognizes the information as SEI data, and, by reading a 3D hierarchy Info SEI message having the payloadType of 49, the receiver uses the corresponding information.

The receiver parses an AVC NAL unit, and, when the nal_unit_type value is equal to 6, the receiver recognizes the information as SEI data, and, by reading a GVR Info SEI message having the payloadType of 50, the receiver uses the corresponding information.

By parsing the 3D_view_dependency_info SEI message, the receiver acquires 3D acquisition information and dependency information of the corresponding view.

By parsing the 3D_hierarchy_info SEI message, the receiver acquires 3D hierarchy information.

By parsing the GVR_info SEI message, the receiver acquires GVR information.

In case the 3D View dependency Info, the 3D Hierarchy Info, and/or the GVR Info are transmitted by being included in a NAL unit at the video level, in order to notify information related to 3D View dependency/3D Hierarchy/GVR, the receiver may be operated as described below.

The receiver parses a NAL unit from a broadcast signal and, then, acquires a slice_layer_extension_rsbp ( ) having a nal_unit_type value of 21, and, then, by parsing the 3D View dependency Info, the 3D Hierarchy Info, and/or the GVR Info, which are included in the slice_layer_extension_rsbp ( ), the receiver may use the parsed information on 3D video decoding.

FIG. 21 illustrates decoding operations of a receiver using 3D hierarchy Info according to an exemplary embodiment of the present invention.

Referring to FIG. 21, in order to decode Video 2, a total of four view components (Video 0, Depth 0, Video 1, Depth 1) are required to be decoded firsthand. Accordingly, 3D Hierarchy Info of Video 2 is required to include information on the four view components (Video 0, Depth 0, Video 1, Depth 1).

FIG. 22 illustrates 3D hierarchy Info for the decoding operations of the receiver of FIG. 21 according to an exemplary embodiment of the present invention.

Since Video 2 corresponds to a texture view component, the hierarchy_view_type field indicates that the view corresponds to a texture view. The hierarchy_view_ID field has a value of '2', which corresponds to a viewpoint identifier of Video 2. Since a total of 4 view components Video 0, Depth 0, Video 1, and Depth 1 are required to be decoded firsthand in order to decode Video 2, the num_hierarchy_embedded_views field has a value of '4'. The 3D hierarchy Info iterates the for loop for as many times the value indicated by the num_hierarchy_embedded_views field, and the information on each of the view components is signaled.

When the receiver decodes a specific stream while considering the value of the coding_priority_index field of each view component, the receiver may determine the required texture view component and/or depth map view component in advance. More specifically, in order to decode Video 2, four components V0, V1, D0, and D1 are required to be received, and, since V1 and D0 are given the same coding_priority_index field value, the receiver may determine that parallel decoding (simultaneously performed decoding) is possible (or available).

Figure 23:
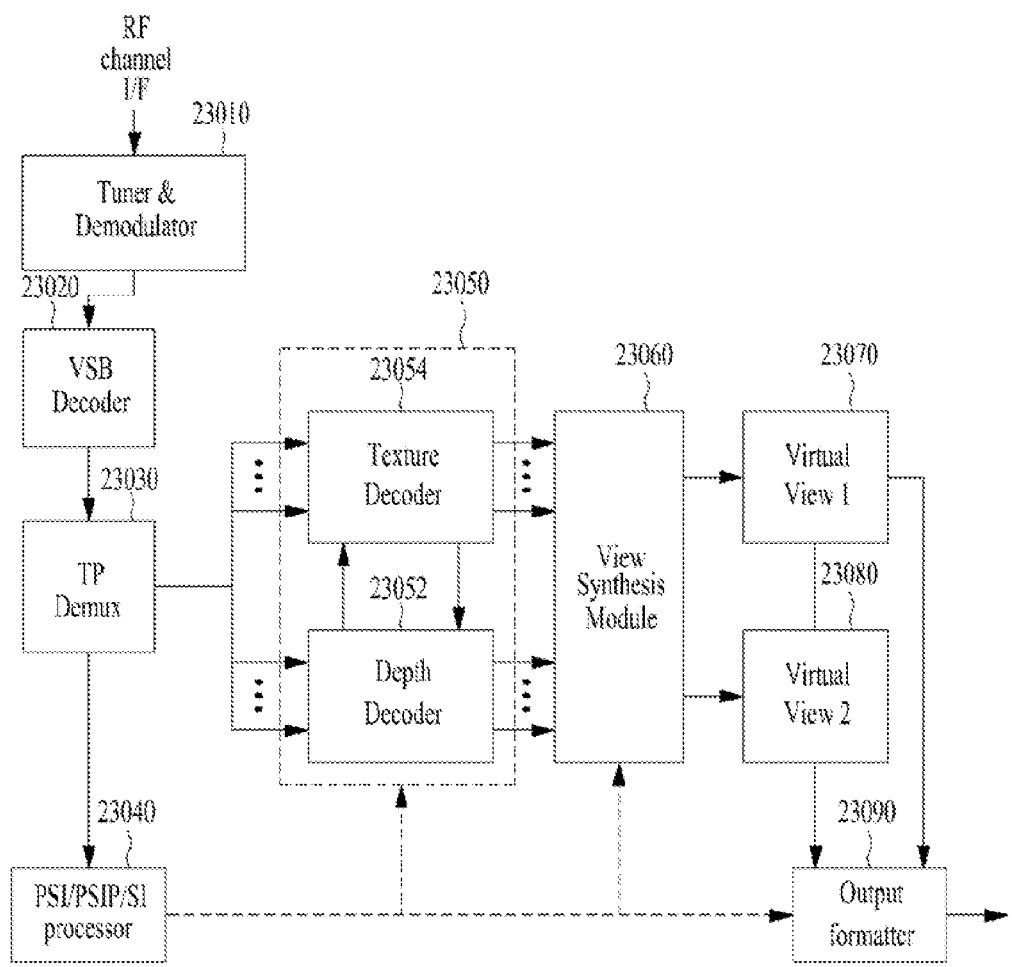
FIG. 23 illustrates a structure of a 3DTV receiver according to an exemplary embodiment of the present invention.

FIG. 23 illustrates a structure of a 3DTV receiver according to an exemplary embodiment of the present invention.

The 3DTV receiver according to the exemplary embodiment of the present invention may include a tuner & demodulator (23010), a VSB decoder (23020), a TP demultiplexer (23030), PSI/PSIP/SI processor (23040), an image component decoder (23050), a depth map image component decoder (23052), a texture image component decoder (23054), a view synthesis module (or image analysis module) (23060), a first virtual image generator (23070), a second virtual image generator (23080), and/or an output formatter (23090).

The 3DTV receiver receives a broadcast signal through the tuner & demodulator (23010) and the VSB decoder (23020). The VSB decoder (23020) will not be limited by its title (or name) and may also be interpreted as an OFDM decoder, and so on.

The TP demultiplexer (23030) extracts video data, system information, and so on, from the broadcast signal via filtering and, then, outputs the extracted data and information. The system information may include PMT, TVCT, EIT, and/or SDT. The TP demultiplexer (23030) may parse a SEI message and/or NAL unit and may, then, acquire 3D View dependency Info, 3D Hierarchy Info, and/or GVR Info, which are included in the SEI message and/or NAL unit.

The PSI/PSIP/SI processor (23040) may receive system information, and, then, the PSI/PSIP/SI processor (23040) may acquire 3D View dependency Info, 3D Hierarchy Info, and/or GVR Info by parsing the received system information. The PSI/PSIP/SI processor (23040) may parse a SEI message and/or NAL unit header and may, then, acquire 3D View dependency Info, 3D Hierarchy Info, and/or GVR Info, which are included in the SEI message and/or NAL unit header. More specifically, the 3D View dependency Info, 3D Hierarchy Info, and/or GVR Info, which are included in the SEI message and/or NAL unit header, may be extracted by the TP demultiplexer (23030) or the PSI/PSIP/SI processor (23040).

The image component decoder (23050) includes the depth map image component decoder (23052) and/or the texture image component decoder (23054).

The depth map image component decoder (23052) decodes depth map image components from the video data.

The texture image component decoder (23054) decodes texture image components from the video data.

The depth map image component decoder (23052) and/or the texture image component decoder (23054) may perform upsampling of the image components by using 3D View dependency Info, 3D Hierarchy Info, and/or GVR Info or may determine dependency between the image components, so as to decode the image components in accordance with the determined dependency. Description of the related operations will be replaced with the detailed description provided above with reference to FIG. 21 and FIG. 22.

The view synthesis module (23060) applies depth information, which is acquired from the depth map image components, to the texture image components.

The first virtual image generator (23070) and the second virtual image generator (23080) respectively performs rendering on a left view image or a right view image each being included in the 3D image. The first virtual image generator (23070) and the second virtual image generator (23080) may be included in the view synthesis module (23060), and the image analysis module (23060) may perform a function of rendering a left view image or a right view image with respect to each viewpoint.

The output formatter (23090) combines the left view image or right view image generated from the first virtual image generator (23070) and the second virtual image generator (23080), thereby outputting a 3D image.

Although the drawings have been distinguished and divided in order to facilitate the description of the present invention, the present invention may provide a design for configuring a new embodiment by combining some of the previously described embodiments of the present invention. Moreover, whenever required by anyone skilled in the art, the scope of the present invention includes designing a recording medium readable by a computer, the computer having a program for executing the above-described embodiments of the present invention recorded therein.

As described above, the device and method according to the present invention may not be limited only to the above-described configuration and methods according to the exemplary embodiments of the present invention, and, therefore, variations of the exemplary embodiments of the present invention may be configured by selectively combining each exemplary embodiment of the present invention fully or in part.

Meanwhile, the method for processing broadcast signals related to a broadcast program according to the present invention may be realized as a code that can be read by a processor, which is provided in a network device, in a recording medium that can be read by a processor. The recording medium that can be read by the processor includes all types of recording devices storing data that can be read by the processor. Examples of the recording media that can be read by a processor may include ROMs, RAMs, CD-ROMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

It will be apparent to those skilled in the art that various modifications and variations can be made in this specification without departing from the spirit or scope of this specification. Thus, it is intended that this specification covers the modifications and variations of this invention provided they come within the scope of the appended claims and their equivalents. It is also apparent that such variations of this specification are not to be understood individually or separately from the technical scope or spirit of this specification.

Also, a device invention and a method invention are both described in this specification. Therefore, whenever required, the description of both inventions may be supplementarily applied.

MODE FOR CARRYING OUT THE PRESENT INVENTION

As described above, the mode for carrying out the present invention is described as a best mode for carrying out the present invention.

INDUSTRIAL APPLICABILITY

The present invention may be used in a series of industrial fields related to the provision of 3DTV broadcast services.

What is claimed is:

1. A method for transmitting view components for three-dimensional (3D) views, the method comprising:
generating one or more texture components and one or more depth map components;
generating a first supplemental enhancement information (SEI) message including a 3D hierarchy information element configured to signal hierarchy information related to coding between the one or more texture components and the one or more depth map components;

generating a second SEI message including a gradual view refresh (GVR) information element configured to signal information related to view component recovery by using a random access point;

generating a first network abstraction layer (NAL) unit including the first SEI message including the 3D hierarchy information element;

generating a second NAL unit including the second SEI message including the GVR information element; and generating a broadcast signal including the one or more texture components, the one or more depth map components, the first NAL unit, and the second NAL unit, wherein the GVR information element comprises a 3D extended view number information indicating a number of view components required to acquire a complete view component.

2. The method of claim 1, wherein the 3D hierarchy information element comprises hierarchy view type information identifying whether a specific view component corresponds to a texture component or to a depth map component.

3. The method of claim 2, wherein the 3D hierarchy information element further comprises hierarchy view identifier information indicating a viewpoint of the specific view component.

4. The method of claim 2, wherein the 3D hierarchy information element further comprises embedded hierarchy view number information indicating a number of view components that are required to be decoded before decoding the specific view component.

5. The method of claim 4, wherein the 3D hierarchy information element further comprises embedded hierarchy view type information identifying whether a view component that is to be decoded before the decoding of the specific view component corresponds to the texture component or to the depth map component, and coding priority index information indicating a decoding priority index of a view component that is to be decoded before the decoding of the specific view component.

6. The method of claim 1, wherein the GVR information element further comprises GVR identification information indicating whether or not a specific access unit corresponds to a GVR random access point, and view identification information identifying view components incapable of being processed with decoding.

7. The method of claim 1, further comprising:
generating a third SEI message including a 3D view dependency information element configured to signal a correlation between the one or more texture components and the one or more depth map components; and
generating a third NAL unit including the third SEI message including the 3D view dependency information element.

8. The method of claim 7, wherein the 3D view dependency information element comprises information indicating whether or not the third SEI message including the 3D view dependency information element provides information on all view components included in a 3D content.

9. A view component receiving device for three-dimensional (3D) views, the view component receiving device comprising:

a tuner configured to receive a broadcast signal including one or more texture components, the one or more depth map components, and network abstraction layer (NAL) units;

a demultiplexer configured to parse the NAL units including a first supplemental enhancement information (SEI) message including a 3D hierarchy information element configured to signal hierarchy information related to coding between the one or more texture components and the one or more depth map components, and a second SEI message including a gradual view refresh (GVR) information element configured to signal information related to view component recovery by using a random access point from the broadcast signal; and a view component decoder configured to decode the one or more texture components and the one or more depth map components by using the 3D hierarchy information element included in the first SEI message and the second SEI message, wherein the GVR information element comprises a 3D extended view number information indicating a number of view components required to acquire a complete view component, and wherein the view component decoder further uses the GVR information element, so as to decode the one or more texture components and the one or more depth map components.

10. The device of claim 9, wherein the 3D hierarchy information element comprises hierarchy view type information identifying whether a specific view component corresponds to a texture component or to a depth map component.

11. The device of claim 10, wherein the 3D hierarchy information element further comprises embedded hierarchy view number information indicating a number of view components that are required to be decoded before decoding the specific view component.

12. The device of claim 11, wherein the 3D hierarchy information element further comprises embedded hierarchy view type information identifying whether a view component that is to be decoded before the decoding of the specific view component corresponds to the texture component or to the depth map component, and coding priority index information indicating a decoding priority index of a view component that is to be decoded before the decoding of the specific view component.

13. The device of claim 9,
wherein the GVR information element further comprises GVR identification information indicating whether or not a specific access unit corresponds to a GVR random access point, and view identification information identifying view components incapable of being processed with decoding.

14. The device of claim 9, wherein the multiplexer further parses the NAL units including a third SEI message including a 3D view dependency information element configured to signal a correlation between the one or more texture components and the one or more depth map components,
wherein the view component decoder further uses the 3D view dependency information element, so as to decode the one or more texture components and the one or more depth map components, and
wherein the 3D view dependency information element comprises information indicating whether or not the third SEI message including the 3D view dependency information element provides information on all view components included in a 3D content.

15. A method for transmitting view components for three-dimensional (3D) views, the method comprising:
- generating one or more texture components and one or more depth map components;
- generating a 3D hierarchy information descriptor configured to signal hierarchy information related to coding between the one or more texture components and the one or more depth map components, wherein the 3D hierarchy information descriptor comprises hierarchy view type information identifying whether a specific view component corresponds to a texture component or to a depth map component, and embedded hierarchy view number information indicating a number of view components that are required to be decoded before decoding the specific view component; and
- generating a broadcast signal including the one or more texture components, the one or more depth map components, and the 3D hierarchy information descriptor,
- wherein the broadcast signal further includes a gradual view refresh (GVR) information element configured to signal information related to view component recovery by using a random access point, and
- wherein the GVR information element comprises a 3D extended view number information indicating a number of view components required to acquire a complete view component.

16. The method of claim 15, wherein the 3D hierarchy information descriptor is included in a program map table (PMT), a virtual channel table (VCT), or a service description table (SDT).

17. The method of claim 15, wherein the 3D hierarchy information descriptor further comprises embedded hierarchy view type information identifying whether a view component that is to be decoded before the decoding of the specific view component corresponds to the texture component or to the depth map component, and coding priority index information indicating a decoding priority index of a view component that is to be decoded before the decoding of the specific view component.

* * * * *